United States Patent [19]

Suh

[11] Patent Number: 5,654,764
[45] Date of Patent: Aug. 5, 1997

[54] DATA SEPARATING CIRCUIT

[75] Inventor: Moon Hwan Suh, Seoul, Rep. of Korea

[73] Assignee: Samsung Electronics Co., Ltd., Kyungki-do, Rep. of Korea

[21] Appl. No.: 273,165

[22] Filed: Jul. 25, 1994

[30] Foreign Application Priority Data

Jul. 23, 1993 [KR] Rep. of Korea ............... 1993-14181

[51] Int. Cl.⁶ .................................................. H04N 7/00
[52] U.S. Cl. .................................. 348/468; 348/465
[58] Field of Search .......................... 348/468, 464, 348/465, 466, 467, 473, 476, 477, 478, 479, 691, 695, 696, 697, 720, 721; 375/76, 110.4; H04N 7/08, 7/087, 7/088, 7/00

[56] References Cited

U.S. PATENT DOCUMENTS

| 5,136,382 | 8/1992 | Meyer | 348/465 |
| 5,223,930 | 6/1993 | Lato | 348/478 |

FOREIGN PATENT DOCUMENTS

| 0531549 | 3/1993 | European Pat. Off. | 348/465 |
| 6284687 | 4/1987 | Japan | 348/465 |
| 2154986 | 7/1987 | Japan | 348/465 |
| 0215182 | 9/1988 | Japan | H04N 7/08 |
| 0176176 | 7/1989 | Japan | H04N 7/08 |
| 2-148986 | 6/1990 | Japan | H04N 7/08 |
| 9407334 | 3/1991 | WIPO | 348/465 |

*Primary Examiner*—Michael Lee
*Attorney, Agent, or Firm*—Sughrue, Mion, Zinn Macpeak & Seas

[57] ABSTRACT

The present invention discloses a data separating circuit for separating digital data contained in a video signal. This invention uses a digital circuit formation rather than an analog circuit formation, in order to stabilize a slicing level. Such stabilization is quite important in TTX DATA separation in order to avoid detrimental effects of the environment, such as temperature variations, or errors in the analog components due to wide error tolerances. Furthermore, the present data separating circuit can analyze variations in the data ranges and in the present slicing level, and appropriately move the slicing level without being affected by noise or the transformation of signals, thereby precisely separating TTX DATA and being capable of adapting to changing conditions.

7 Claims, 8 Drawing Sheets

DATA SEPARATING CIRCUIT

BACKGROUND OF THE INVENTION

1. Field of the Invention

The present invention relates to a data separating circuit for separating digital data inserted in a video signal. More particularly, the present invention relates to a data separating circuit applicable to a television having a teletext system, or a television or video cassette recorder (VCR) having a captioning function, which is adapted by controlling a slicing level, used for converting analog teletext information into digital data, in response to noise or a signal transformation.

2. Description of the Prior Art

A conventional circuit for separating digital data in a video signal employs only analog circuits. In order to generate an average value of a clock synchronous signal of digital data which operates as a data slicing level, a condenser is charged by means of a low pass filter to produce a direct current (DC) value. This value serves as a reference voltage for a comparator to separate digital data which is applied to one input terminal of the comparator. However, characteristics of analog circuit devices are easily affected according to changes in environmental temperature. Furthermore, since the analog devices have wide error tolerances, each system comprised of these analog devices has differing problems due to differences in the analog devices' characteristics.

Data separation in a conventional data separating circuit is performed by clamping the slicing level to a simple DC value. Accordingly, such a system cannot operate properly to transform input signals in the presence of noise. Therefore, conventional data separating circuits have different data separating capacities for each system, and the data separating characteristics deteriorate over time.

Japanese Patent Laid-open Publication No. 90-148986 discloses a technique preventing the disorder of a character screen produced by noise that exceeds the slicing level by selectively passing signals for one line of slice ending and regenerative clock signals. That is, according to this technique, the constituent parts of frequency signals half the clock frequencies included in the signals for one line of slice ending are detected to detect the appearance of the synchronous part arranged in the lead of the data line.

The signal spliced and regenerative clock signals are selectively passed as long as with a period of time from the detecting time to the appearing time of the next horizontal synchronous signal, which can prevent the disorder of the character screen by the false character data provided by the noise that is beyond the slicing level.

In such a system, the data may be exactly separated but cannot cope with the transformation of input signals and noise.

SUMMARY OF THE INVENTION

The present invention seeks to solve the above-mentioned problems.

It is an object of the present invention to provide a data separating circuit that stabilizes a slicing level in view of the environment or error in a component, by employing digital circuits rather than analog circuits, and which is capable of moving the slicing level according to the noise or transformation of the signals, analyzing the range of data variation and the present slicing level to adapt and separate data.

A data separating circuit of this invention comprises:

a digital/analog converter receiving digital data for receiving an input and converting the data to a linear voltage and to output it to a data slicing level;

a voltage moving circuit moving a data slicing level produced from the digital/analog converter to a desired reference voltage;

a direct current stabilizing circuit for maintaining a stable direct current level irrespective of the condition of a complex image signal;

a comparator for comparing a direct current level of the voltage moving circuit with a complex image signal level of the direct current stabilizing circuit;

a reset generating circuit for generating a counter reset signal at an initial stage of a horizontal line;

a level sampling circuit for determining a sampling block for analyzing a slicing level and generating a signal showing that the data that is input at present is teletext data;

a counter for counting up or down, the teletext data produced from the comparator;

a latch for latching a latch signal D-LATCH generated from the level sampling circuit;

a level detecting circuit for dividing the level of the data latched in the latch into three levels by means of an output LINE-CLR from the reset generating circuit and by the D-VALID signal from the level sampling circuit, and enabling a signal corresponding to the slicing level;

a signal analyzing circuit for determining a counting direction and a counting value of the data generating circuit connected to the rear, and receiving an enable signal from the level detecting circuit, holding the count at the stable slicing level, and then recycling the count that is held corresponding to the change of signal; and a data generating circuit for generating digital data for converting a slicing level from the digital/analog converter, and receiving an output signal from the signal analyzing circuit.

DETAILED DESCRIPTION OF THE INVENTION

Figure 1:
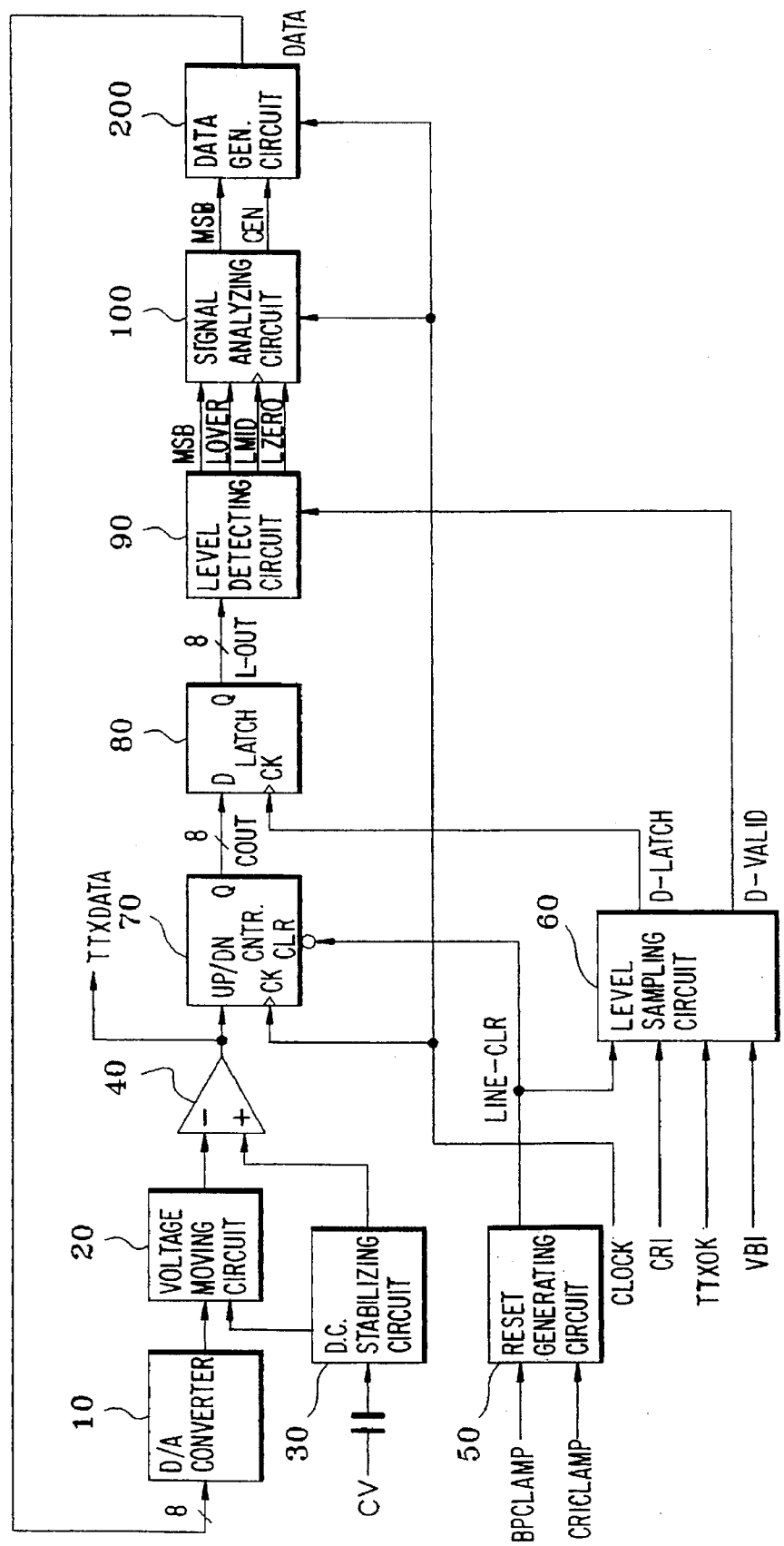
FIG. 1 is a schematic circuit diagram of a data separating circuit according to the present invention.

Referring to FIG. 1, the data separating circuit comprises a digital/analog converter 10 that receives a 8-bit input digital signal and converts it to a linear voltage which corresponding to a data slicing level; a voltage moving circuit 20 that moves a data slicing level produced from the digital/analog converter 10 to a desired reference voltage; a direct current (DC) stabilizing circuit 30 for maintaining a stable DC level irrespective of the condition of a composition video signal CV; a comparator 40 comparing the DC level of the voltage moving circuit 20 with a composition video signal level of the DC stabilizing circuit 30; a reset generating circuit 50 for generating a counter reset signal at an initial stage of the horizontal line; a level sampling circuit 60 for determining a sampling block for analyzing a slicing level and generating a signal indicating that the data that is input at present is teletext data; a counter 70 for counting up or counting down according to the teletext data produced from the comparator 40; a latch 80 for latching a latch signal D-LATCH generated from the level sampling circuit 60; a level detecting circuit 90 for dividing the level of the data latched in the latch 80 into three levels and activating a corresponding signal; a signal analyzing circuit 100 for determining a counting direction and a counting number of the data generating circuit 200 with receiving an enable signal of the level detecting circuit 90, holding the count at the stable slicing level, and then recycling the count that is held corresponding to the change of signal; and a data generating circuit 200 for generating digital data DATA for converting a slicing level output to the digital/analog converter 10, by receiving an output signal from the signal analyzing circuit 100.

The digital/analog converter 10 receives an 8-bit digital feed-back signal from the data generating circuit 200 and converts it into a linear voltage in the range of 0–0.7 V.

For example, the digital/analog converter 10 produces an output voltage of 0 V when the input data is "00", and it produces an output voltage of 0.7 V when the input data is "FF". The voltage moving circuit 20 moves the voltage converted in the digital/analog converter 10 to a reference voltage produced in the DC stabilizing circuit 30. For example, if the output voltage of the digital/analog converter 10 is in the range 0–0.7 V and the reference voltage produced by the DC stabilizing circuit 30 is 3.3 V, the output voltage of the voltage moving circuit 20 becomes 3.3–4 V. The DC stabilizing circuit 30 clamps the input composition video signal CV to a predetermined reference level and stabilizes the DC level to be a constant level irrespective of the condition of the input signal. The DC stabilizing circuit 30 outputs this constant level as a reference signal to the voltage moving circuit 20. The DC stabilizing circuit 30 also outputs to the comparator 40, a composite video signal containing the TTX data. The comparator 40 compares the level of the composite video signal, containing the TTX data and output from the DC stabilizing circuit 30, with a DC level output from the voltage moving circuit 20. The comparator 40 outputs a positive signal to the counter 70 when the DC level of the composite video signal is higher than the reference DC level produced from the voltage moving circuit 20. The comparator 40 outputs a negative signal to the counter 70 when the level of the composite video signal is lower than the reference DC level.

The reset generating circuit 50 receives a low level (L) BPCLAMP signal at an initial stage of each horizontal line and outputs a clear signal to the various counters.

Moreover, the reset generating circuit 50 attains a high level (H) CRICLAMP signal generated from the horizontal line on which a teletext data TTX DATA exists and then sends reset signal to each counter.

Figure 4:
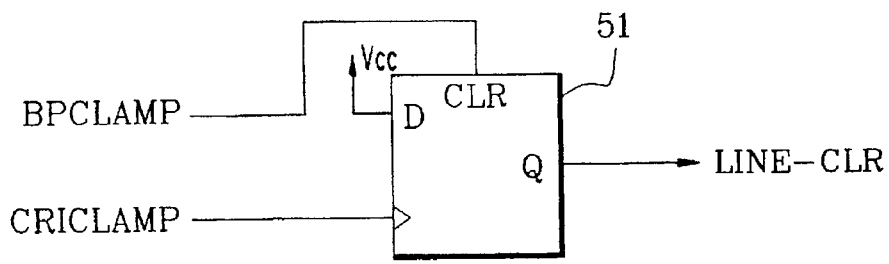
FIG. 4 is a detailed circuit diagram of a reset generating circuit shown in FIG. 1.

FIG. 4 shows a detailed circuit diagram of the reset generating circuit 50, in which the BPCLAMP signal is applied to a clear terminal CLR and an input terminal D of a flip-flop 51 is held at a high level, and the CRICLAMP signal is applied to the clock terminal so that a LINE-CLR signal is produced at the output terminal Q. The BPCLAMP, CRICLAMP and LINE-CLR signals input to, or output from the reset generating circuit 50 are shown in the timing chart of FIG. 10.

Figure 5:
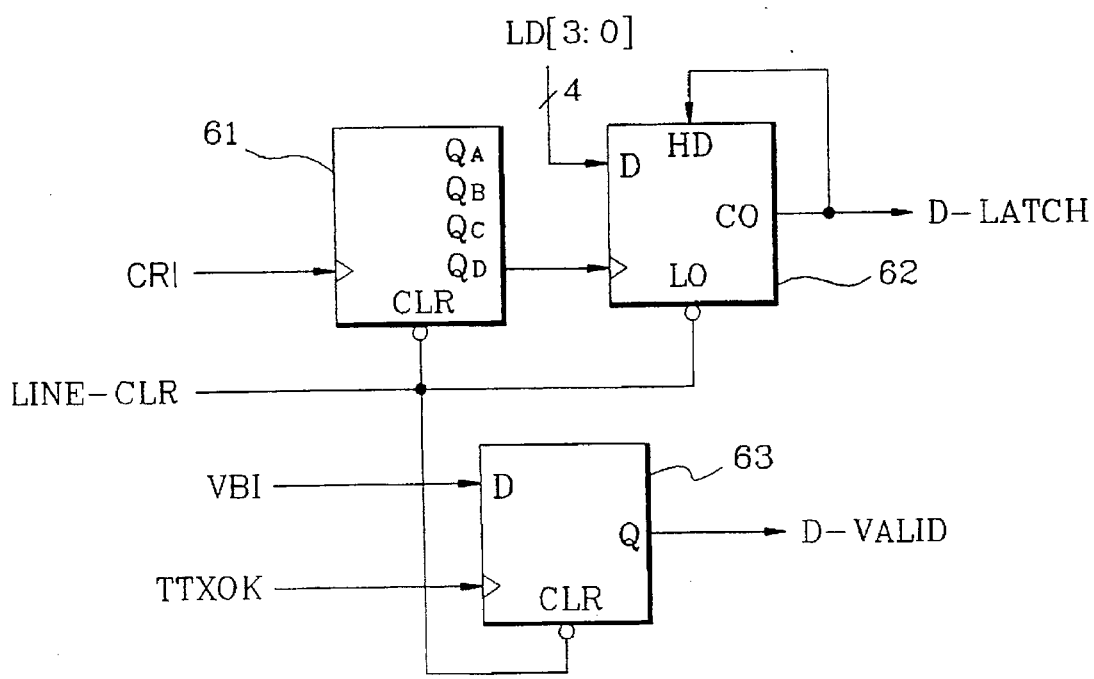
FIG. 5 is a detailed circuit diagram of a level sampling circuit shown in FIG. 1.

The level sampling circuit 60 produces D-LATCH signals by sampling the number of TTX CRI signals, to analyze the location of the data slicing level, and D-VALID signals for showing that the data input at present is TTX DATA. The level sampling circuit 60 includes a 4-bit up-counter 61, a 4-bit down-counter 62 and a flip-flop 63, as shown in FIG. 5. The LINE-CLR signal produced from the reset generating circuit 50 is input to each clear terminal CLR of the 4-bit up-counter 61 and flip-flop 63, and to a load terminal LO of the 4-bit down-counter 62. The clock signal CRI is input to the clock terminal of the 4-bit up-counter 61, and the vertical blanking interval VBI and TTX OK signals are input to the D terminal and the clock terminal of the flip-flop 63, respectively. Thus, the 4-bit down-counter 62 produces a D-LATCH signal and the flip-flop 63 produces a D-VALID signal.

Figure 10:
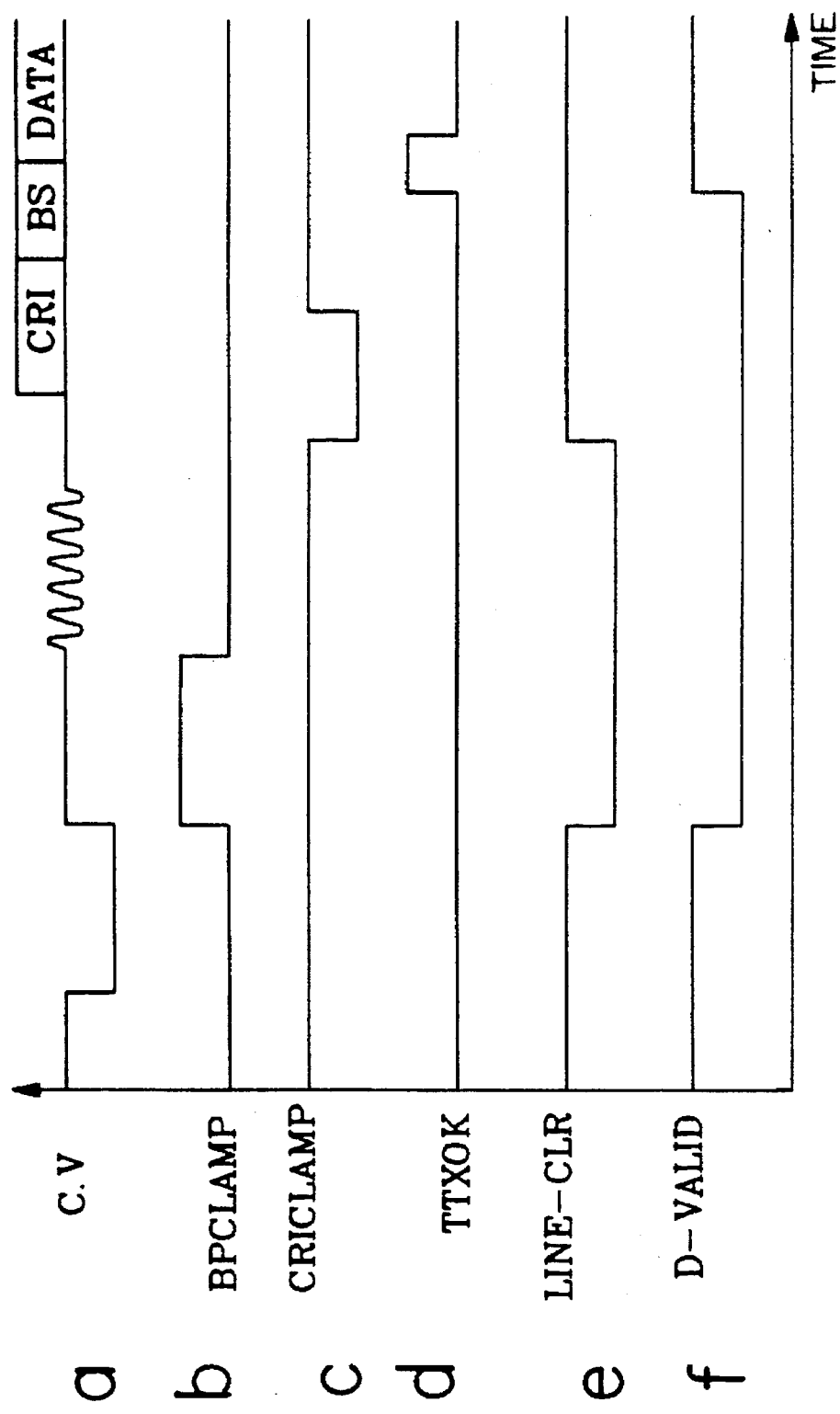
FIG. 10 is a timing chart of LINE-CLR shown in FIG. 1.
Figure 11:
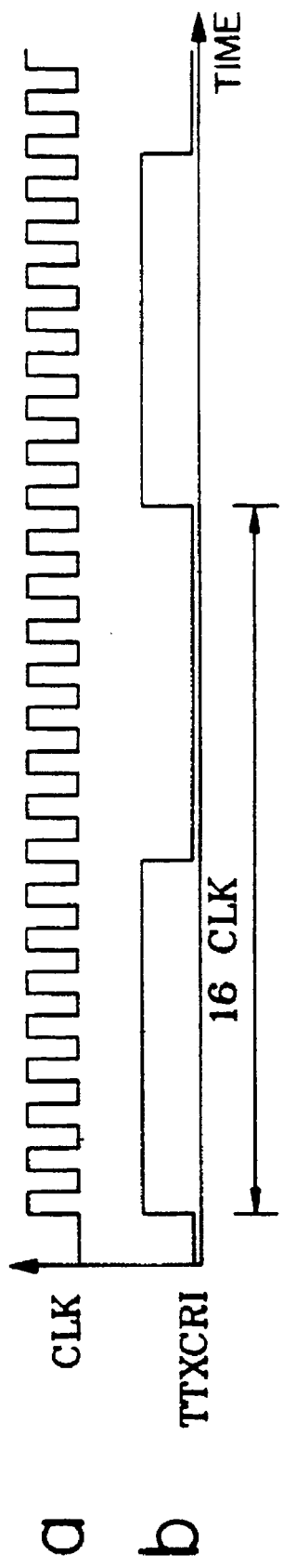
FIG. 11 is a timing chart of CLOCK and TTX CRI of FIG. 1.
Figure 12:
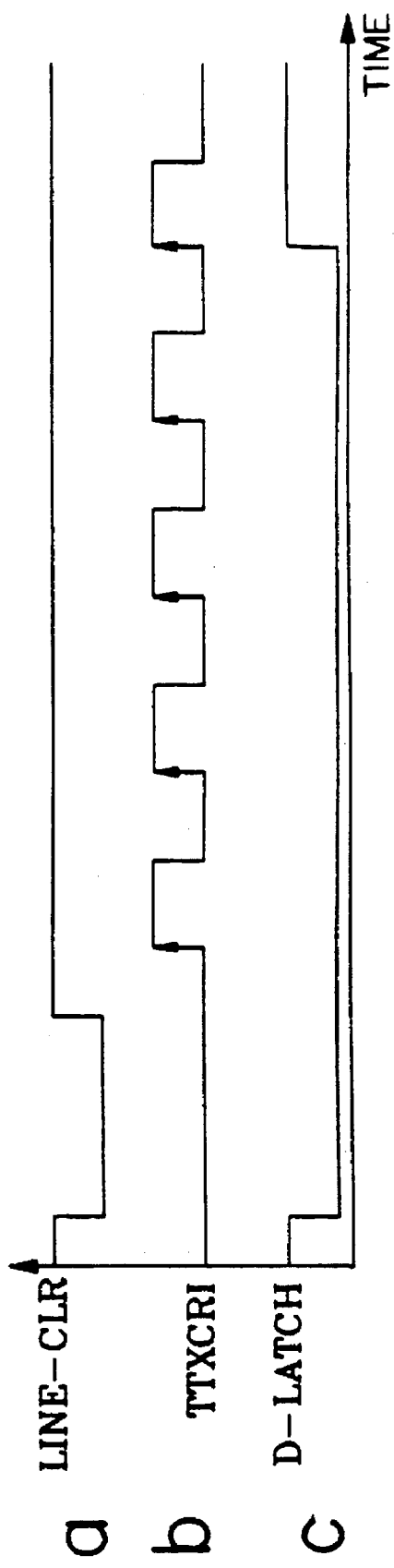
FIG. 12 is a timing chart Of D-LATCH and TTX CRI shown in FIG. 1.

The input/output waveforms of the level sampling circuit 60 are depicted in the timing charts shown in FIGS. 10 and 11. The D-LATCH signal is a sampling signal which attains a low level L at an initial stage of the horizontal line indicated by the LINE-CLR signal produced from the reset generating circuit 50. D-LATCH attains a high level H after the occurrence of several CRI TTX synchronous signals, as shown in FIG. 12.

The D-LATCH signal is produced by a clock signal CRI input to the 4-bit up-counter 61. The CRI signal is produced by dividing the CLOCK signal by 16 (see FIG. 11), and if the D-LATCH signal is enabled after a 4th clock pulse, the D-LATCH signal is generated after 64 pulses of the CLOCK signal (16×4=64). The data input to the level detecting circuit 90 is changed when the D-LATCH signal is generated.

A signal D-VALID is generated by a vertical blanking interval VBI signal enabled during the vertical blanking interval after the vertical synchronous signal, and by a TTX OK signal which is shown in FIG. 10.

The D-VALID signal output from the level detecting circuit 90 is input to the signal analyzing circuit 100 at just the point in time when the TTX DATA signal is present, in order to prevent a malfunction due to noise. The counter 70 is cleared at an initial stage of each horizontal line and performs counting of the TTX CRI signal. The counter is controlled by the TTX DATA produced from the comparator 40. If the high-level range of the TTX DATA produced from the comparator 40 is larger than the low-level range, the counter 70 counts in a positive direction, otherwise the counter 70 counts in a negative direction. If the ranges of HIGH and LOW are similar to each other, the count value stays near zero. The results of the counter 70 indicate exactly where the slicing level of the comparator 40 is located. By analyzing this value, the proper data is fed back to the digital/analog converter 10 to change the present slicing level.

The latch 80 includes a 8-bit flip-flop, and latches the resultant value of the counter 70 by means of the D-LATCH enable signal output from the level sampling circuit 60. If the latch 80 is enabled after the 4th of D-LATCH and CRI signals, the data latched in the latch 80 becomes an average value over a period of 4 clock pulses of the CRI signal.

Figure 2:
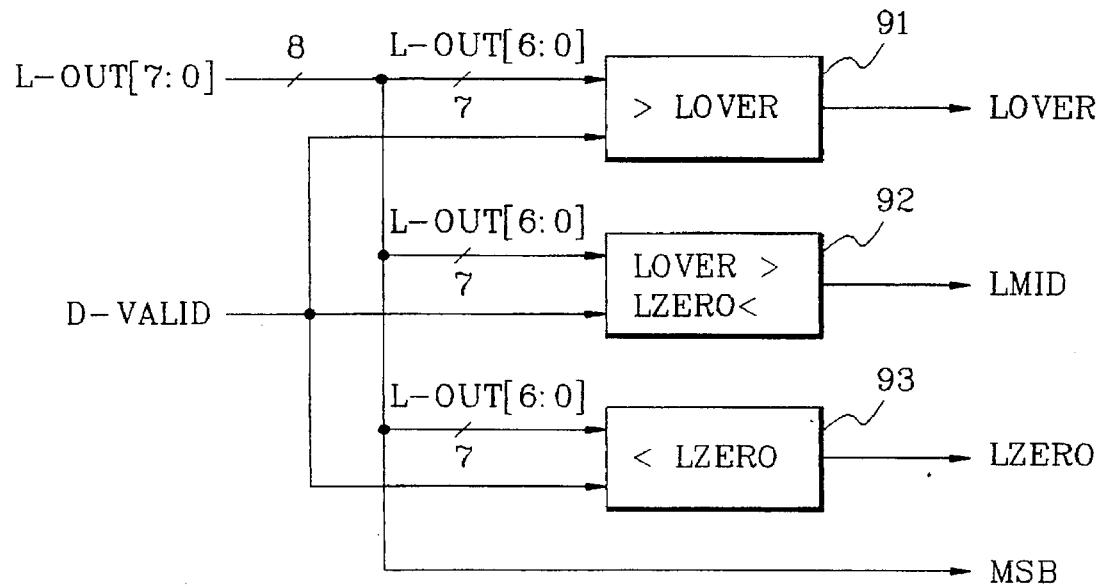
FIG. 2 is a detailed circuit diagram of a level detecting circuit shown in FIG. 1.
Figure 13:
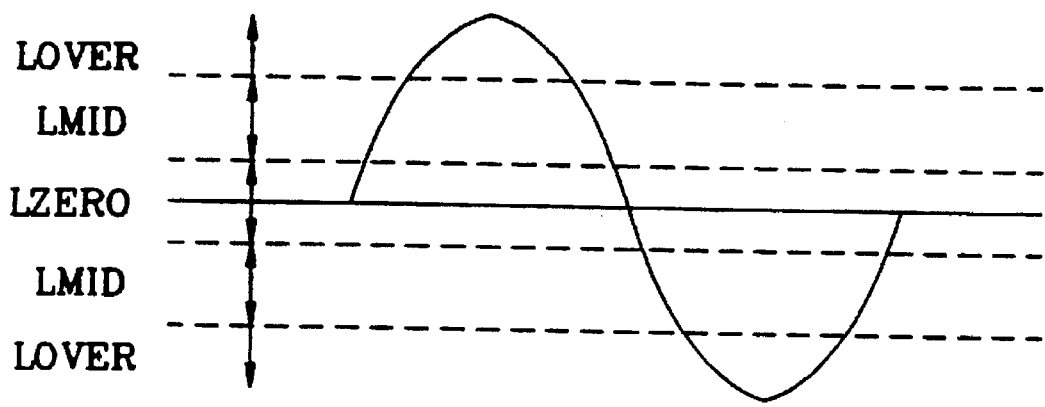
FIG. 13 is a timing chart of TTX DATA and slicing level point shown in FIG. 1.

The level detecting circuit 90 includes 3 comparators 91, 92 and 93 as shown in FIG. 2, and divides the signal from the latch 80, L-OUT (7:0), into three regions and enables an output signal in one of the corresponding regions. The level detecting circuit 90 divides L-OUT (7:0) into three regions as shown in FIG. 13 and enables a output signal LOVER, LMID and LZERO, in the corresponding region. The signals LOVER, LMID and LZERO are produced after the signal D-VALID is activated.

If the D-VALID signal is low, all the output signals attain a low level. The LOVER signal is activated when the slicing level is located at more than ±½ of input data, and the LMID signal is activated when the slicing level exists within the ranges +⅙ to +½ or −⅙ to −½. The signal LZERO is activated when the slicing level exists around the center point of the data, that is when the data is in the range between ±⅙. Whether the slicing level attains a positive value or a negative value is determined by the most significant bit (MSB) of the data. That is to say, if the MSB is 0, the count data is negative and the slicing level is located below the center, and if the MSB is 1, the count data is positive and the slicing level is determined to be located above the center.

Figure 3:
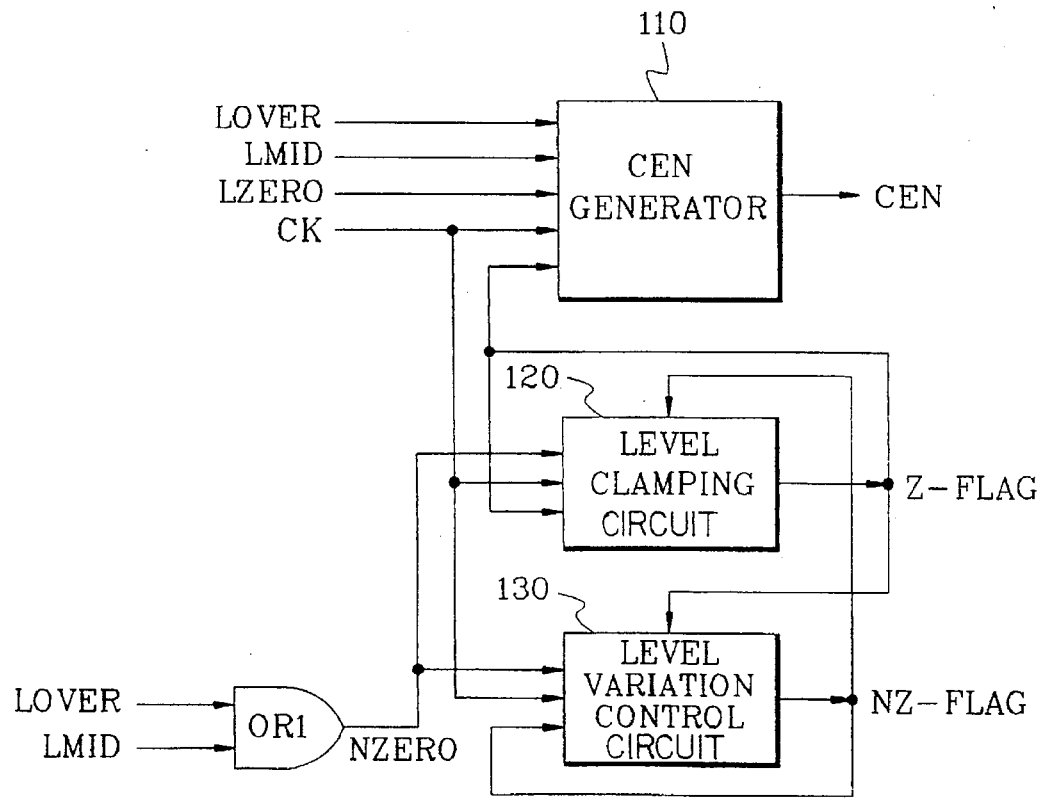
FIG. 3 is a detailed circuit diagram of a signal analyzing circuit shown in FIG. 1.
Figure 8:
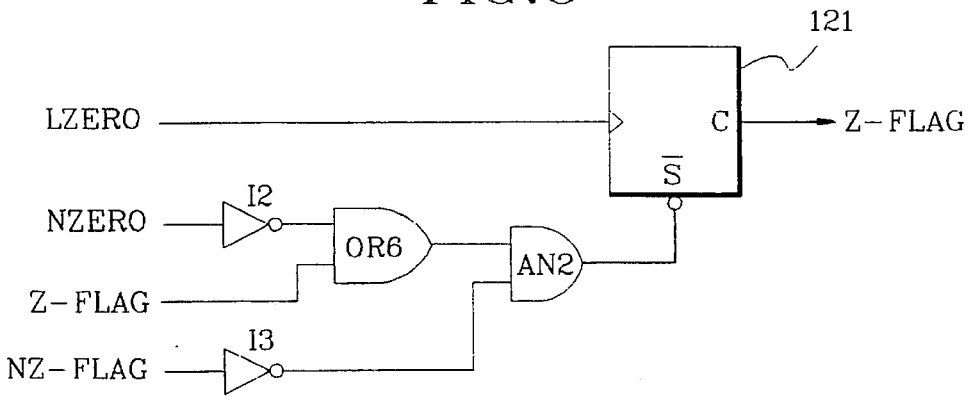
FIG. 8 is a detailed circuit diagram of a level clamping circuit shown in FIG. 3.
Figure 9:
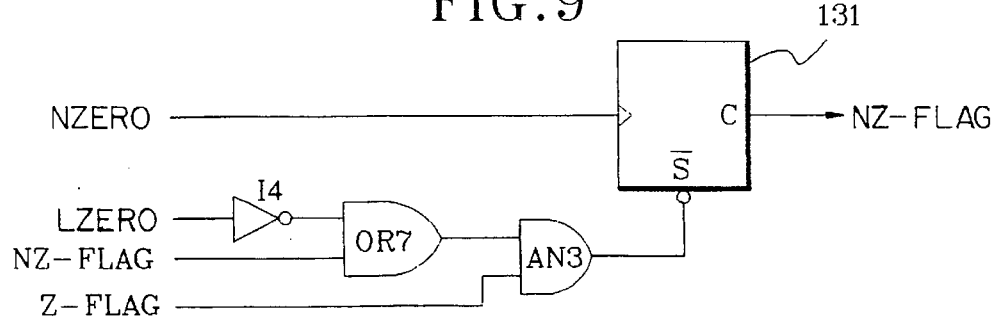
FIG. 9 is a detailed circuit diagram of a level variation control circuit shown in FIG. 3.
Figure 14:
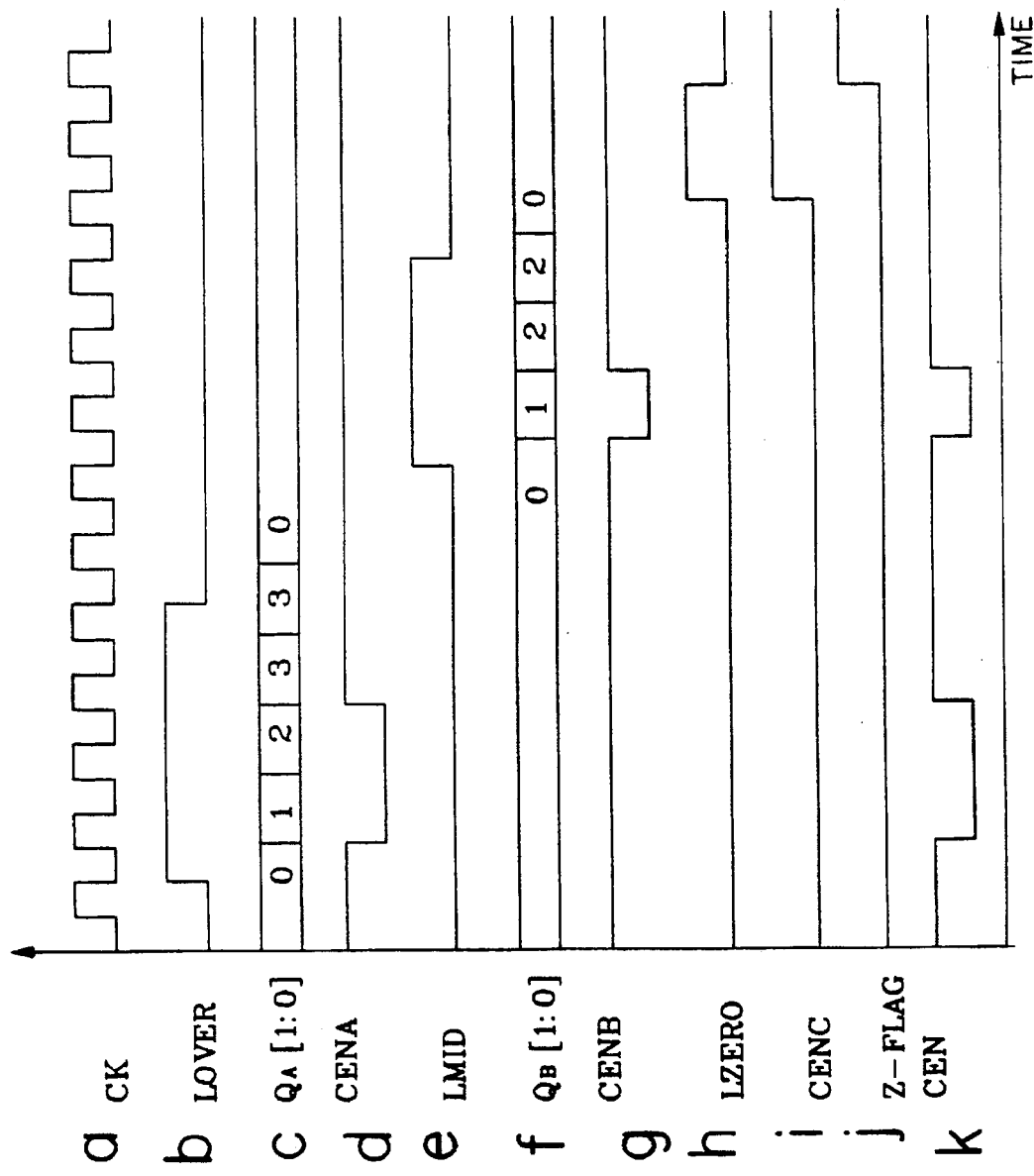
FIG. 14 is a timing chart of a CEN generating circuit shown in FIG. 3.

The signal analyzing circuit 100 analyzes the signals generated by the level detecting circuit 90 and produces a count enable CEN signal which controls the number of counts for the next step in the data generating circuit 200. The detailed circuit diagram of the signal analyzing circuit 100 is shown in FIG. 3, and its corresponding timing chart is shown in FIG. 14. The signal analyzing circuit 100 includes a CEN generating circuit 110 for generating a CEN signal, a level clamping circuit 120 and a level variation control circuit 130, as shown in FIG. 3. The detailed circuit diagram of the CEN generating circuit 110 is shown in FIG. 7, and the detailed circuits diagrams for the level clamping circuit 120 and level variation control circuit 130 are shown in FIGS. 8 and 9, respectively.

Figure 7:
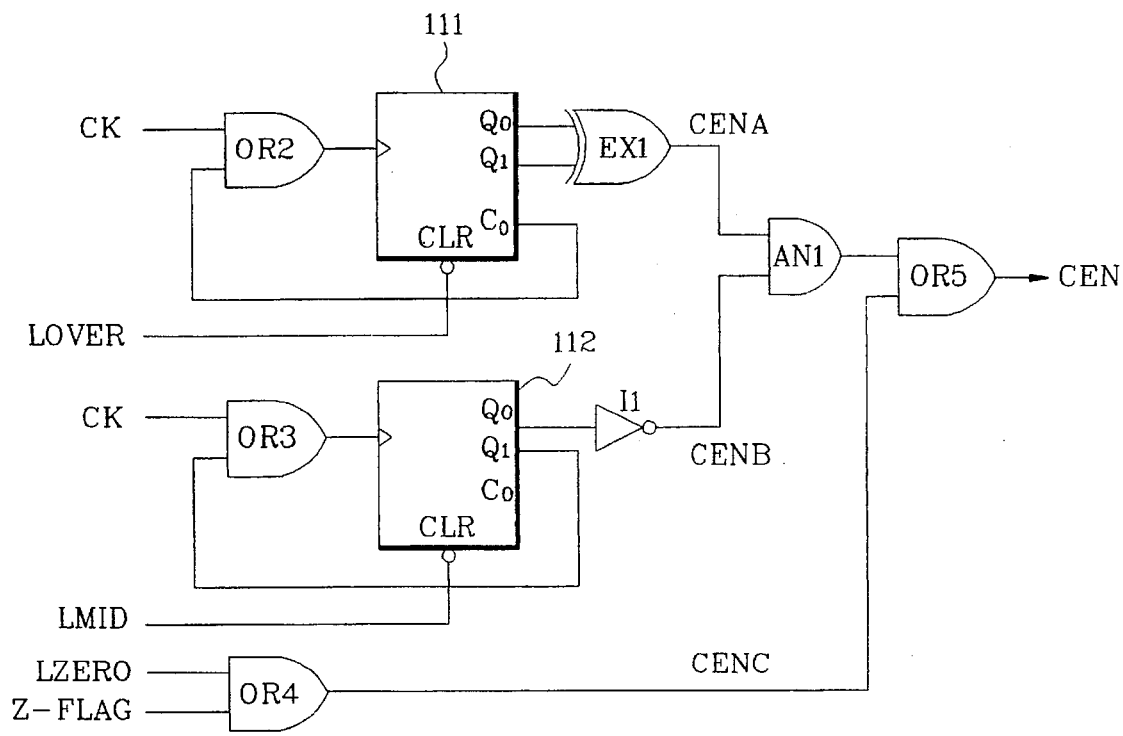
FIG. 7 is a detailed circuit diagram of a CEN generating circuit shown in FIG. 3.

A clock signal CLOCK and an output signal $C_0$ of counter 111, as shown in FIG. 7, are logically combined by OR gate OR2 and applied to a clock terminal of the 2-bit counter 111 of the CEN generating circuit 110. Counter 111 also has a clear terminal CLR to which the LOVER signal is applied, and output signals $Q_0$ and $Q_1$ of the 2-bit counter 111 are logically combined by exclusive OR gate EX1.

Furthermore, the clock signal CLOCK and the output signal $Q_1$ of counter 112 are logically combined by OR gate OR3 and the result applied to a clock terminal of the 2-bit counter 112. Counter 112 has a clear terminal CLR to which LMID signal is applied, and output signal $Q_0$ of the 2-bit counter 112 is provided to inverter 11. In addition, the CEN generating circuit logically combines the output of exclusive OR gate EX1 and the output of inverter 11 with AND gate AN1, which provides its output to OR gate OR5.

OR gate OR5, receives an output from an OR gate OR4 that logically combines the LZERO and Z-FLAG signals. OR5 logically ORs the output of OR4 with the output of AND gate AN1 to produce a CEN signal.

If the LOVER signal is activated, the CEN signal is enabled just in a period of time of two clocks right after the LOVER signal becomes HIGH, and the counter of the data generating circuit 200 is changed as much as 2 positive (+) or negative (−) from its present value. If the LMID signal is enabled, the CEN signal is enabled just in a period of time of one clock right after the LMID signal becomes HIGH, and the counter of the data generating circuit 200 is changed as much as 1 in positive or negative from its present value. The slicing level, at this point, is located at around the center of the data.

The level clamping circuit 120, shown in FIGS. 3 and 8, logically ORs an NZERO signal which is inverted by inverter 12 and a Z-FLAG signals in OR gate OR6. Moreover, it logically ANDs the output of OR6 and an NZ-FLAG signal inverted by inverter 13, by AND gate AN2. The output of AN2 is applied to a set enable terminal S of a 3-bit down-counter 121. A LZERO signal is applied to a clock terminal of the 3-bit down-counter 121 so that the Z-FLAG signal is produced from the output terminal C. The level clamping circuit 120 determines whether the LZERO signal is generated temporarily by noisy signal environments or signal distortion, and if the LZERO signal is discontinuously generated once or twice, and the other signal is enabled, then it is difficult to determine whether or not the present slicing level exists on or around the center of the data.

The level clamping circuit 120 is assured that the present slicing level is located at or around the center of the data and enables the Z-FLAG signal when the LZERO signal is continuously generated (e.g., in a period of 8 lines).

If the Z-FLAG signal is enabled, the CEN signal of the CEN generating circuit 110 is disabled irrespective of the other input signal, and the data output of the data generating circuit 200 thereby used to determine the slicing level.

In the level variation control circuit 130, an LZERO signal inverted by inverter 14 and an NZ-FLAG signal are logically combined in OR gate OR7, whose output is applied to AND gate AN3. Also applied to AND gate AN3 is the Z-FLAG signal. The output of AN3 is applied to the set enable terminal S of a 3-bit down-counter 131. The NZERO signal is applied to a clock terminal of the 3-bit down-counter 131 so that an NZ-FLAG signal is output from output terminal C.

The level variation control circuit 130 operates when the Z-FLAG signal is enabled. If the condition of a receiving signal is changed from the present condition and is maintained without interruption, the slicing level should be readjusted, and the level variation control circuit 130 analyzes the variation condition of this signal. That is, the NZERO signal is produced by logically ORing the LOVER and LMID signals, and if the LOVER or LMID signal is produced continuously more than the desired number of lines, the NZERO signal determines the condition of the signals to be changed and enables the NZ-FLAG signal.

Figure 6:
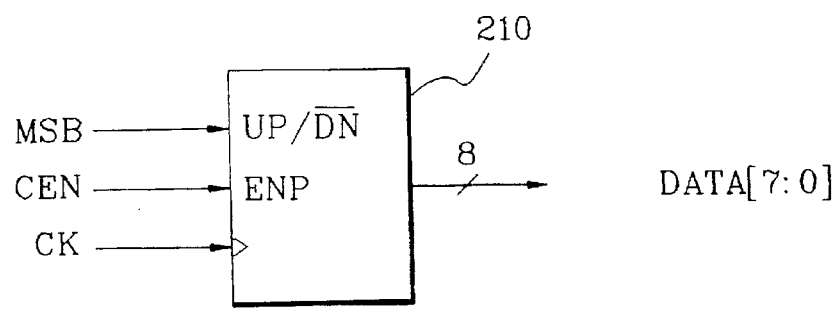
FIG. 6 is a detailed circuit diagram of a data generating circuit shown in FIG. 1.

The Z-FLAG signal is disabled by the NZ-FLAG, and the CEN signal generates a signal corresponding to the input signal. The data generation circuit 200 includes an up/down counter 210 as shown in FIG. 6, and the direction of the up/down counter 210 is controlled by the most significant bit MSB produced from the signal analyzing circuit 100.

In other words, if the MSB is 0, the data slicing level is located under the center of the data, and the up/down counter 210 operates toward the reduction of the count value in order to raise the slicing level. If the MSB is 1, the up-down counter 210 operates toward the increase of the count value contrary to the above, to set the slicing level. The counting number for a horizontal line is controlled by the CEN signal. The CEN signal is activated for a period of time corresponding to two clocks pulses when the LOVER signal is active.

The counting value is fed back to the digital/analog converter 10, and the slicing level is controlled by this signal data.

Now, the detailed operation of the present invention is described.

An initial data value is fed back from the data generating circuit 200 and input to the digital/analog converter 10 during an initial stage of power-on. This initial data value is set so that the slicing level is located at about 3.3 V, if the video DC level is about 3 V. Thus, at this point, a voltage of 0.3 V at the digital/analog converter 10 is raised to 3.3 V by the voltage moving circuit. The composite image signal CV is clamped to a DC voltage of 3 V via the DC stabilizing circuit 30. This clamped signal is output to the voltage moving circuit, as a reference signal. The DC stabilizing circuit also outputs the CV signal, containing the TTX data, to the comparator 40, which compares the CV signal with the slicing level output from the voltage moving circuit 20, which produces a digital signal in the range of 0–5 V. TTX DATA is compared to the initial slicing level when the horizontal line containing the TTX DATA is present. Thus, the TTX DATA is converted, based on the slicing level, into digital data in the range of 0–5 V. This digital TTX DATA is applied to an up/down terminal UP/DN of the counter 70. The counter 70 counts up when the value of the up/down terminal UP/DN is positive and counts down when the value of the up/down terminal UP/DN is negative. Thus, an average value of the input TTX DATA signal is produced.

The counter 70 is cleared by the LINE-CLR signal, so as to be reset at the initial stage of a horizontal line. The counter 70 counts based on the CLOCK signal, which has a frequency 16 times higher than the CRI clock, from the beginning part of the CRI signal.

If the slicing level is located at the lower part of the center of the data, the positive range (+) of the data is larger than that of 0, and the count data of the counter 70 is thereby increased. If the slicing level is to the contrary, the count value of the counter 70 is increased in the positive direction, and the most significant bit MSB of this count data becomes positive. Moreover, if the slicing level is located at or around the center of the data, a counting result of about zero is obtained. The counting result of the counter 70 is latched in the latch 80 after about 4 clocks of the CRI signal by the D-LATCH and the latched data is applied to the level detecting circuit 90. The level detecting circuit 90 applies 7-bits of the data to three comparators 91, 92 and 93, excluding only the MSB from among the 8-bit input data L-OUT (7:0).

The comparator 91 activates the LOVER signal when the input data exceeds the lower limit of the LOVER signal, which is shown in FIG. 13. The comparator 92 activates the LMID signal when the input data is located in the region between the LOVER level and the LZERO level, and the comparator 93 activates the LZERO signal when the input data is less than the lower limit of the LMID level. The LOVER, LMID, LZERO signals produced from the comparators 91, 92 and 93 are output after the D-VALID signal is activated, which can prevent a malfunction due to noise triggering an output, rather than the output being based on the TTX data.

The activated output signal of the level detecting circuit 90 is applied to the signal analyzing circuit 100, as shown in FIG. 3. The signal analyzing circuit 100 includes a count enable (CEN) generation circuit 110, a level clamping circuit 120 and a level variation control circuit 130. The CEN generation circuit 110 activates the CEN signal to a low level for two clock periods when the LOVER signal is activated, and activates the CEN signal to a low level for one clock period when the LMID signal is active. If the LZERO or Z-FLAG signal is active, the CEN generating circuit 110 leaves the CEN signal disabled.

The CEN signal output from the CEN generating circuit 110 is applied to the data generating circuit 200. The level clamping circuit 120 of the signal analyzing circuit 100 includes a 3-bit down-counter 121 to which the LZERO signal is applied as a clock input, and a set enable terminal S to which a control signal is input.

The level clamping circuit 120 is now described in detail.

The counter 121 reduces the present value as much as 1 at a rising edge of the LZERO signal. If the counting value is zero, the Z-FLAG is activated as an H level, and the Z-FLAG signal attains a low level before the value is zero. The NZERO signal is activated as H when the Z-FLAG attains a low level, the counter 121 is set and its counting value becomes initialized.

According to this function, when the LZERO signal detects an error at the slicing by the noise and is active, it is determined whether or not the slicing level is exactly located at the center of the data.

In a case that the LZERO signal is discontinuous and the LOVER and LMID signals are produced midway, the slicing level should be continually adjusted.

If the LZERO signal is produced continuously a certain number of times, the present circuit includes 8 lines, and if the signal is produced more than 8 times, the 3-bit down-counter 121 becomes zero. Further, the count stops at this value of zero, and the Z-FLAG attains a H state. After the Z-FLAG attains a H state, it is determined that the present data slicing level is located almost at the center of the data, and the set enable terminal $\overline{S}$ of the counter 121 serves as a mask, and the situation of the counter being set by a discontinuous NZERO signal can be prevented. The slicing level is clamped and noise cannot produce a variation in the level.

The level variation control circuit 130 is now described in detail. The level variation control circuit 130 operates the 3-bit down-counter 131 when the Z-FLAG signal attains an H-STATE. The data slicing level is clamped by the Z-FLAG signal, and if the characteristics of the data signal is changed, it is determined whether or not the present slicing level is changed.

The 3-bit down-counter 131 may count as the set enable terminal S attains an H-state by the Z-FLAG signal. If the NZERO signal is activated as a result of the LOVER or LMID signals, the signal counts down at a rising edge of this signal. If the LZERO signal is produced before the counting value reaches zero, the counting value is changed into an initial value. In the case where the NZERO signal is produced more than 8 times, it can be determined that the condition of the data level has some variations. The counter 131 becomes zero and the NZ-FLAG signal is activated. As a result, the set enable terminal $\overline{S}$ of the level clamping circuit 120 is pulled low, and the Z-FLAG attains a low level.

The clamped data value is changed according to the state of the level detecting signal. The output of the signal analyzing circuit 100 is applied to the data generating circuit 200, which includes the up/down counter 210, as shown in FIG. 6. The counting direction (up/down) of the up/down counter 210 is controlled by the most significant bit MSB of the output data of the signal analyzing circuit 100. If the MSB attains a high level or a low level, the counter 210 counts up or down, respectively.

The up/down counter 210 is count-enabled only when the CEN signal is low. If the up/down counter 210 is count-enabled, the counter 210 is synchronized by the CLOCK signal, and, accordingly, counts up or down.

Since the counting result is fed back to the digital/analog converter 10, the data slicing level is controlled by the variation of the counting value output from the counter 210. Thus, the feed-back loop is closed.

The conventional system employs analog techniques to extract teletext data, and the exact data slicing level for teletext data exclusion cannot be achieved because of the temperature variations of analog devices and their associated error rates. Thus, if the condition of a received signal is not very good, the conventional system causes considerable data errors.

However, the digital system of the present invention solves the problems inherent in the conventional analog system, and adapts the data slicing level so that the slicing level is located at the most proper position according to the characteristics of the received signal.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A data separating circuit comprising:
   means for extracting data contained in a video signal based on a slicing level;
   means for digitally adjusting the slicing level based on the extracted data comprising:
   means for counting the extracted data to determine a representative level of the extracted data and outputting a count value indicating the number of extracted data counted by said means for counting, wherein a counting direction of said means for counting is determined based on the extracted data input to said means for counting;
   means for detecting and classifying the representative level of the extracted data based on said count value output from said means for counting; and
   means for generating an adjusted digital slicing level based on the detected and classified level of the extracted data; and
   means for converting the digitally adjusted slicing level into an analog slicing level and providing said analog slicing level to said means for extracting data.

2. A data separating circuit comprising:
   a digital/analog converter for receiving an input digital data signal and converting said data signal to a linear voltage representing a data slicing level;
   a voltage moving circuit for moving said data slicing level to a desired reference voltage;
   a direct current stabilizing circuit for maintaining a stable direct current (DC) level irrespective of the quality of an input composition video signal;
   a comparator for comparing said reference voltage from said voltage moving circuit with the stable DC level from the direct current stabilizing circuit and outputting a digital data signal;
   a reset generating circuit for generating a counter reset signal at an initial stage of a horizontal line;
   a level sampling circuit for determining a sampling period for analyzing a slicing level, and generating a data valid signal and a latch signal;
   a counter for counting up and down the digital data output from the comparator;
   a latch for latching an output of the counter when the latch signal is received;
   a level detecting circuit for dividing the level of the latched data into a plurality of levels based on the counter reset signal and the data valid signal, and activating a signal corresponding to the slicing level;
   a signal analyzing circuit for determining a counting direction and a counting value, and receiving the activation signal from the level detecting circuit, holding the count value at a stable slicing level, and re-operating on the held count according to the slicing level; and
   a data generating circuit for generating a digital data slicing signal based on output signals from the signal analyzing circuit.

3. The circuit as set forth in claim 2, wherein said reset generating circuit comprises a flip-flop, wherein a BPCLAMP signal generated at an initial stage of each horizontal line is applied to an input terminal and a clear terminal of said flip-flop, and a CRICLAMP signal generated when TTX DATA exists in a horizontal line is applied to a clock terminal of said flip-flop so that a LINE-CLR signal is output.

4. The circuit as set forth in claim 2, wherein said level sampling circuit includes:
   a 4-bit up-counter having a clock terminal for receiving a CLOCK signal and also having a clear terminal for receiving the counter reset signal;
   a 4-bit down-counter having a clock terminal for receiving an output from said 4-bit up-counter and generating the latch signal; and
   a flip-flop having an input terminal for receiving a vertical blank interval signal, a clock terminal for receiving a TTX OK signal and a clear terminal for receiving the counter reset signal, which generates the data valid signal.

5. The circuit as set forth in claim 2, wherein said level detecting circuit is comprised of first, second and third comparators wherein the slicing level output from the latch, the data valid signal, and the counter reset signal are input, wherein the first comparator is activated outputting a LOVER signal when the slicing level is more than ±½ of the level of the latched data, the second comparator is activated outputting a LMID signal when the slicing level is located at within one of ranges +⅙ to +½ and −½ to −½ of the level of the latched data, and the third comparator is activated outputting a LZERO signal when the slicing level is substantially equal to the center of the latched data.

6. The circuit as set forth in claim 2, wherein said signal analyzing circuit comprises:
   a level clamping circuit and a level variation control circuit for producing Z-FLAG and NZ-FLAG signals, respectively, wherein each circuit receives a NZERO signal generated by logically combining the output signals of the level detecting circuit in an OR gate; and a CEN generating circuit for outputting a CEN signal controlling the driving of the data generating circuit, based on a clock signal, the output signals of said level detecting circuit, and said Z-FLAG and NZ-FLAG signals.

7. The circuit as set forth in claim 5, wherein said signal analyzing circuit includes:

a CEN generating circuit for outputting a CEN signal controlling the driving of the data generating circuit, based on a clock signal and the LOVER, LMID and LZERO signals of said level detecting circuit; and a level clamping circuit and a level variation control circuit to produce Z-FLAG and NZ-FLAG signals, respectively, wherein each circuit receives a NZERO signal generated by logically combining the LOVER signal and the LMID signal of the level detecting circuit in an OR gate.

* * * * *